US012552443B2

(12) United States Patent
Span

(10) Patent No.: US 12,552,443 B2
(45) Date of Patent: Feb. 17, 2026

(54) STEERING DEVICE FOR STEERING A VEHICLE, AND METHOD FOR DETECTING AN INGRESS OF WATER USING SUCH A STEERING DEVICE

(71) Applicant: ZF Automotive Germany GmbH, Alfdorf (DE)

(72) Inventor: Eduard Span, Cologne (DE)

(73) Assignee: ZF Automotive Germany GmbH, Alfdorf (DE)

( * ) Notice: Subject to any disclaimer, the term of this patent is extended or adjusted under 35 U.S.C. 154(b) by 840 days.

(21) Appl. No.: 17/871,291

(22) Filed: Jul. 22, 2022

(65) Prior Publication Data
US 2023/0034783 A1 Feb. 2, 2023

(30) Foreign Application Priority Data
Jul. 29, 2021 (DE) .......................... 102021208177.0

(51) Int. Cl.
*B62D 3/12* (2006.01)
*B62D 5/04* (2006.01)
*B62D 15/02* (2006.01)
*G01N 19/02* (2006.01)

(52) U.S. Cl.
CPC ........... *B62D 3/126* (2013.01); *B62D 5/0481* (2013.01); *B62D 15/0225* (2013.01); *G01N 19/02* (2013.01)

(58) Field of Classification Search
CPC .. B62D 3/126; B62D 5/0481; B62D 15/0225; G01N 19/02
See application file for complete search history.

(56) References Cited

U.S. PATENT DOCUMENTS

2017/0050669 A1\* 2/2017 Asakura ............... B62D 5/0448

FOREIGN PATENT DOCUMENTS

| CN | 104029715 A | \* | 9/2014 | .......... G01M 13/021 |
| DE | 102018222750 A1 | | 6/2020 | |
| JP | 2014234102 A | \* | 12/2014 | |
| KR | 20200023356 A | \* | 3/2020 | ........... B62D 5/0481 |
| WO | WO-2016098557 A1 | \* | 6/2016 | ........... B62D 5/0481 |

\* cited by examiner

*Primary Examiner* — Jacob D Knutson
(74) *Attorney, Agent, or Firm* — Kristin L. Murphy

(57) ABSTRACT

The disclosure relates to a steering device for steering a vehicle, having a housing and having a rack. The rack is movable in the longitudinal direction of the rack and in relation to the housing. The rack has a detection installation for detecting an ingress of water. In order to be able to detect an ingress of water at an early stage, in a reliable manner and/or by an ideally cost-effective detection installation. The steering device includes that the detection installation has at least one friction installation which reacts to an ingress of water. The friction installation, upon reacting to the ingress of water and in the event of a movement of the rack, causing an increase in friction.

16 Claims, 3 Drawing Sheets

STEERING DEVICE FOR STEERING A VEHICLE, AND METHOD FOR DETECTING AN INGRESS OF WATER USING SUCH A STEERING DEVICE

CROSS-REFERENCE TO RELATED APPLICATION

This application claims priority to German Patent Application No. 102021208177.0, filed Jul. 29, 2021, the disclosure of which is incorporated herein by reference in its entirety.

TECHNICAL FIELD

The disclosure relates to a steering device for steering a vehicle, having a housing and having a rack, the rack being movable in the longitudinal direction of the rack and in relation to the housing, and having a detection installation for detecting an ingress of water. The disclosure furthermore relates to a method for detecting an ingress of water using such a steering device.

BACKGROUND

A steering device of this type is known from DE 10 2006 051 799 A1. An electrical sensor installation for identifying an ingress of water is used as a detection installation herein. In the event of an ingress of water, electrical conductivity is generated in an electrolyte-forming substance which is disposed between a sensor housing and an electrode, said electrical conductivity being utilized for detecting or determining, respectively, the ingress of water.

In particular, the steering device has a drive for configuring a power-assisted steering device and/or a steer-by-wire steering device. Steering devices of this type can be used in vehicles, or motor vehicles, respectively, such as passenger motor vehicles or in commercial vehicles. The drive can be configured as an electric motor. The steering device is to be, or is, preferably installed in the engine bay where the former is exposed to significant stress. Inter alia, the steering device can be exposed to severe contamination, wherein a sealing element such as, for example, sealing bellows, that seals in particular the moving parts which are routed out of the housing can be damaged by virtue of stone-chipping, for example. In particular, axle steering mechanisms routed out of the housing are sealed by sealing bellows which can suffer damage. In the event of damage to the sealing element or sealing bellows, water or moisture, respectively, can enter the housing of the steering device. An ingress of water into the housing can lead to damage, increased wear or premature failure of the steering device so that complex repair work may be necessary. In this instance, an ingress of water cannot be spotted in good time without a suitably configured detection installation so that damage is spotted, for example as a result of the total failure of the steering device or of the drive of the steering device, only long after an ingress of water into the steering device.

SUMMARY

What is needed is to refine a steering device and/or a method of the type mentioned at the outset so that an ingress of water is able to be detected at an early stage, in a reliable manner and/or by means of an ideally cost-effective detection installation. An alternative exemplary arrangement is in particular to be provided.

The object on which the invention is based is achieved by a steering device according to claim 1 and/or by means of a method according to claim 10. Preferred refinements of the invention are to be found in the dependent claims and in the description hereunder.

The steering device is configured for steering a vehicle, for example a motor vehicle. In one exemplary arrangement, the steering device is installed in a vehicle or a motor vehicle. The steering device has a housing and a rack. The rack here is movable in the longitudinal direction of the rack and in relation to the housing. In this way, the rack can be displaced in a linear or translatory manner in the longitudinal direction of the rack. Wheels of the vehicle can be moved by the steering device and/or the rack, and the vehicle can be steered as a result.

The steering device has a detection installation for detecting an ingress of water. A water ingress identification is implemented as a result. An ingress of water in the context of the present disclosure refers, for example, to identifying ingressing liquids and/or moisture of any type, the scope of protection of the present disclosure thus not being limited only to the ingress of water. Other liquids and/or kinds of moisture which cause potential damage within the steering device can also be detected or identified by the detection installation. These liquids may include, for example, rainwater, foul water, salt water, radiator coolant, brake fluid, oil and/or other operating fluids of a motor vehicle and/or liquids and/or kinds of moisture by virtue of environmental influences.

The detection installation has at least one friction installation which reacts to an ingress of water, the friction installation upon reacting to the ingress of water and in the event of a movement of the rack causing an increase in friction.

It is advantageous here that an increase in friction in the event of movement of the rack is able to be achieved by a friction installation and by virtue of the reaction of the friction installation to the ingress of water, in particular by virtue of contact between ingressing water and the friction installation. This enables an early and reliable identification of an ingress of water, the correspondingly configured detection installation moreover being able to be implemented in a cost-effective manner. In particular, the increase in friction being created by the friction installation in the event of an ingress of water and contact between the friction installation and the water or the liquid and/or moisture, respectively, can unequivocally be assigned to the reaction to the ingress of water.

The increase in friction of the friction installation and upon reacting to the ingress of water is limited in terms of the location and/or predefined in terms of the location. The friction installation is disposed at a predefined position. As a result, an increase in friction that arises can unequivocally be assigned to the friction installation and thus to the reaction to the ingress of water. An unequivocal detection of an ingress of water is enabled as a result.

The friction installation can be disposed on the rack. In particular, the friction installation is disposed at a predefined position and on an external circumference of the rack. In this way, the friction installation and the increase in friction upon reacting to an ingress of water, or contact with water, respectively, is limited to a predefined region or portion on the rack. During the operation of the steering device the friction installation, conjointly with the rack, can move in the longitudinal direction of the rack. In particular, the friction installation is movable and/or displaceable conjointly with the rack and in relation to the housing. The steering device can have a single friction installation or a plurality of friction installations. In particular, the steering device has two, three or a plurality of friction installations which are disposed so as to be distributed in the longitudinal direction on the rack. In one exemplary arrangement, the friction installation is disposed on the rack so as to be in the region of an end or an end portion of the latter.

According to a further exemplary arrangement the friction installation is disposed in a groove of the rack. The groove here is configured in an external circumference of the rack so as to encircle, in particular radially, a longitudinal axis of the rack. In this way, the friction installation is disposed, or disposable, respectively, in a simple manner on the rack. In particular in a state in which a reaction to an ingress of water is absent, or prior to contact with water, respectively, the friction installation is disposed completely within the groove of the rack. In particular in a state in which a reaction to an ingress of water is absent, or in the absence of contact with water, respectively, an external diameter of the friction installation is smaller than an external diameter of the rack, or the external diameter of the friction installation corresponds to the external diameter of the rack. As long as there is no contact between the friction installation and water, or prior to the reaction to an ingress of water, respectively, said friction installation therefore has no influence whatsoever on the function or movement of the rack.

According to one exemplary arrangement, the rack is mounted within the housing by at least one rack bearing. An external circumference of the rack here bears so as to be able to slide on an internal circumference of the rack bearing. The friction installation causes the increase in friction when passing the rack bearing and upon reacting to the ingress of water. In this way, the increase in friction can unequivocally be assigned to the interaction between the friction installation and the rack bearing. In the absence of any contact with water, or in the absence of a reaction to an ingress of water, respectively, the friction installation can pass the rack bearing without contacting the latter and/or without any increase in friction, respectively. In one exemplary arrangement, the increase in friction results by virtue of the interaction between the rack bearing and a portion of the rack having the friction installation. The increase in friction here results in relation to the friction between the rack bearing and portions of the rack without the friction installation.

According to a further exemplary arrangement, the friction installation has a reaction element. The reaction element here is formed from a water-absorbent, for example hygroscopic and/or hydrophilic, material. The reaction element may be formed from a water-absorbent plastics material. The reaction element expands by virtue of absorbing water, and/or a volume of the reaction element increases by virtue of absorbing water. In one exemplary arrangement, the friction installation and/or the reaction element upon contact with water, or upon reacting to an ingress of water, respectively, and when disposed in a groove of the rack has an external diameter which is larger than the external diameter of the rack. When the friction installation during operation now passes the rack bearing, for example, this results in the increase in friction. This increase in friction is in particular limited in terms of the location, or limited to the interaction between the friction installation and the rack bearing, respectively. The reaction element can be configured as a ring. The ring can be implemented as a closed or as an open ring. The configuration as an open ring simplifies the assembly in a groove of the rack in that said open ring can simply be snapfitted.

According to one exemplary arrangement, the friction installation has a spring element. The spring element here interacts with the reaction element. For example, the reaction element and the spring element are disposed in one groove, or conjointly in the same groove, respectively, of the rack. The spring element here is positioned between a groove base of the groove and the reaction element. In particular, the spring element bears on the groove base, on the one hand, and on the reaction element, on the other hand. The spring element is configured as an O-ring, for example. The spring element can enable the reaction element to be displaced inward, in particular radially to the longitudinal axis of the rack. After contact with water, or upon reacting to an ingress of water, respectively, for example, the reaction element can project outward, radially to the longitudinal axis of the rack, beyond the external circumference, or external diameter, respectively, of the rack. However, the rack bearing can enable only the smaller external diameter of the rack to pass. When the reaction element now comes into contact with the rack bearing, the reaction element by virtue of the spring element can be pressed radially inward, into the groove. As a result, it is made possible that the friction installation passes through the rack bearing even upon contact with water, or upon reacting to an ingress of water, respectively. The interaction between the spring element, the reaction element and the rack bearing here furthermore causes the increase in friction. At the same time, the steering device continues to be fully functional.

According to a further exemplary arrangement, the increase in friction is determinable and/or detectable by a sensor and/or evaluation installation. The sensor installation and/or the evaluation installation preferably are/is already present as a customary component part of the steering device. In particular, sensors already present for the usual operation of the steering device are used for determining the increase in friction. The increase in friction can be detected and/or determined by a steering angle sensor and/or a current consumption sensor. Additionally or alternatively to the use of the current consumption sensor, a torque sensor can be present or utilized, respectively, for detecting and/or determining the increase in friction. In particular, a combination of the steering angle sensor and the current consumption sensor, or a combination of the steering angle sensor and the torque sensor, is utilized for detecting and determining the increase in friction. By virtue of such a combination of sensors, the increase in friction caused by an ingress of water can unequivocally be assigned to the friction installation.

According to one exemplary arrangement, the increase in friction of the friction installation upon reacting to the ingress of water is detectable and/or determinable by virtue of a current consumption peak for a drive for moving the rack. The increase in friction to be expected in particular in the event of an ingress of water here, and/or the current consumption peak are/is assigned to a predefined steering angle or steering angle range. The steering angle or the steering angle range can be detected and/or determined by the steering angle sensor. The current consumption peak is detectable and/or determinable by the current consumption sensor. In one exemplary arrangement, the steering angle or the steering angle range is predefined by virtue of the predefined position of the friction installation on the rack and in relation to the predefined position of the rack bearing. In this way, a current consumption peak for the predefined steering angle or steering angle range can unequivocally be assigned to the friction installation and thus to the reaction of the friction installation to contact with water.

A method for detecting an ingress of water using the steering device according to the disclosure is particularly advantageous. The detection installation here has at least one friction installation that reacts to an ingress of water. An increase in friction is caused by the friction installation upon reacting to the ingress of water, or upon contact between the friction installation and water and in the event of a movement of the rack. An increase in friction that is limited in terms of the location and/or is unequivocally determinable in terms of the location is in particular caused.

The increase in friction is detected and/or determined by the steering angle sensor and/or the current consumption sensor. In particular, the increase in friction of the friction installation upon reacting to the ingress of water is detected and/or determined by virtue of a current consumption peak for a drive for moving the rack. The increase in friction to be expected in the event of an ingress of water and/or the current consumption peak here are/is assigned to a predefined steering angle or steering angle range. The steering angle or steering angle range is predefined by virtue of the predefined position of the friction installation on the rack and in relation to the predefined position of the rack bearing on the housing.

The steering device produced according to the method according to the disclosure is in particular an above-described steering device according to the disclosure. The method is preferably refined according to the design exemplary arrangements explained in the context of the steering device according to the disclosure described herein. Furthermore, the steering device described herein can be refined according to the design exemplary arrangements explained in the context of the method.

BRIEF DESCRIPTION OF DRAWINGS

The disclosure will be explained in more detail hereunder by means of the figures. Identical reference signs here refer to identical, similar or functionally equivalent components or elements. In the figures.

DETAILED DESCRIPTION

Figure 1:
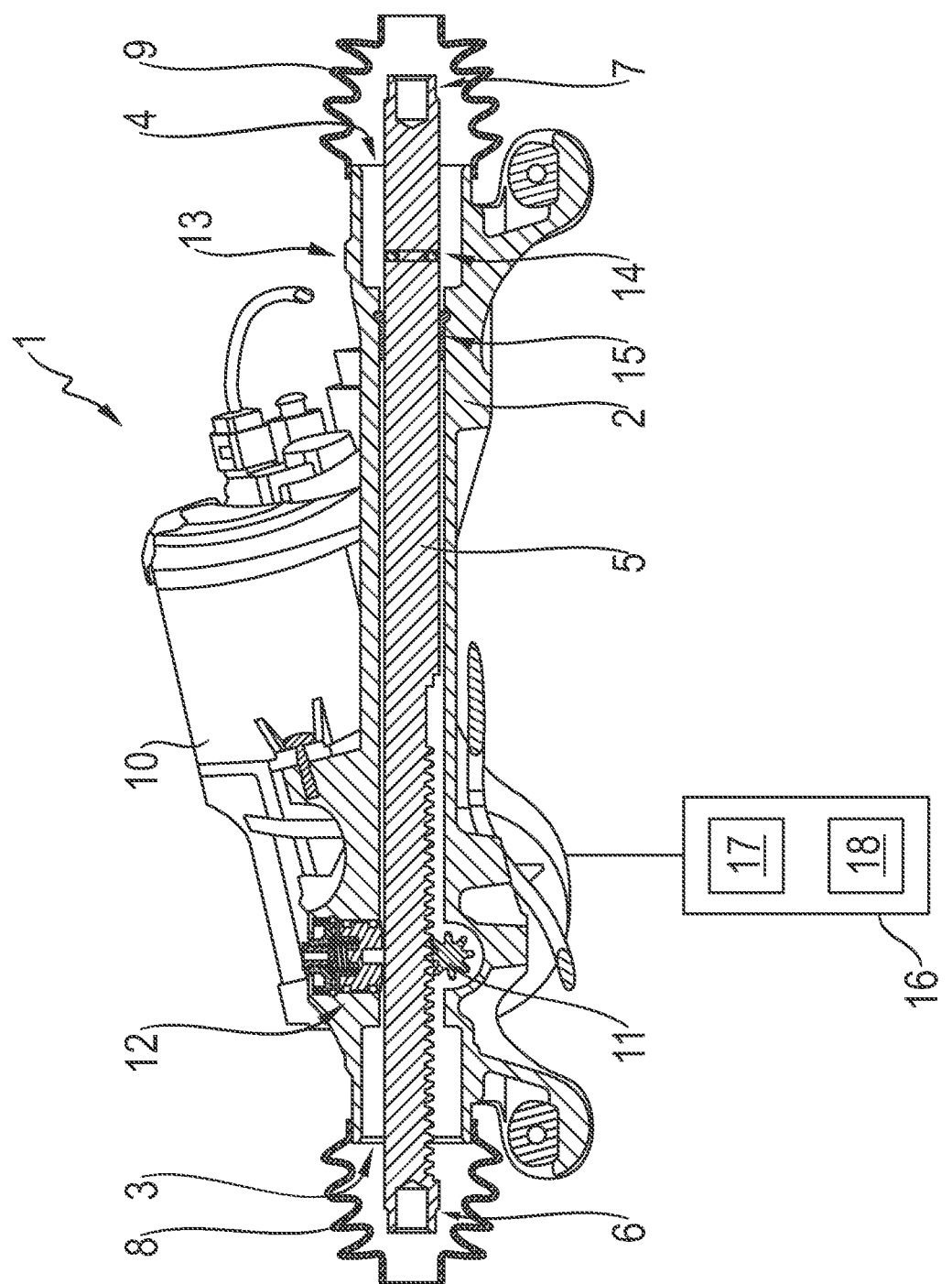
FIG. 1 shows a partially sectional lateral view of a steering device according to the disclosure.

FIG. 1 shows a partially sectional lateral view of the steering device 1 according to the disclosure. The steering device 1 in this exemplary arrangement is configured as a steer-by-wire steering device. The steering device 1 serves for steering a vehicle not illustrated in more detail here. The steering device 1 has a housing 2. The housing 2 has two open housing ends 3, 4 which are arranged facing away from one another. The steering device 1 furthermore has a rack 5. The rack 5 is disposed in the housing 2, two rack ends 6, 7 which face away from one another protruding from the housing ends 3, 4. The rack ends 6, 7 are configured to connect to control arms not illustrated in more detail here.

Furthermore indicated here are sealing elements 8, 9. The sealing elements 8, 9 are configured as sealing bellows. These sealing elements 8, 9 are disposed in the region of the housing ends 3, 4, or of the rack ends 6, 7, respectively. Proceeding from the housing end 3, 4, the sealing elements 8, 9 extend to a control arm which is not illustrated in more detail here and is able to be assembled, or is assembled, respectively, on the rack end 6, 7. The sealing elements 8, 9 thus seal the housing ends 3, 4 and prevent the ingress of water and/or moisture into the interior of the housing 2.

The rack 5 is movable in the longitudinal direction thereof and in relation to the housing 2. To this end, the steering device 1 has a drive 10. The drive 10 in this exemplary arrangement is fastened to an external side of the housing 2. The drive 10 can drive the rack 5 by means of a pinion 11. The drive 10 is configured here as an electric motor. The steering device 1 in this exemplary arrangement also has a contact pressure device 12 which is disposed on a side of the rack 5 that faces away from the pinion and presses the rack 5 in the direction of the pinion 11 and onto the latter.

Furthermore, the steering device 1 has a detection installation 13 for detecting an ingress of water. The detection installation 13 has a friction installation 14 that reacts to an ingress of water. In this exemplary arrangement the friction installation 14 is disposed so as to be adjacent to the rack end 7. Alternatively or additionally, the friction installation 14, or a further friction installation 14, can be disposed so as to be adjacent to the rack end 6. Likewise alternatively or additionally, the friction installation 14, or a further friction installation 14, can be disposed in a central region of the rack 5.

The friction installation 14 is disposed or configured, respectively, at a predefined position and on the external circumference of the rack 5.

The rack 5 by, a rack bearing 15, is mounted within the housing 2. In this exemplary arrangement the steering device 1 has only a single rack bearing 15. Alternatively, the steering device 1 may have a plurality of rack bearings 15, for example two rack bearings 15. An external circumference of the rack 5 bears on an internal circumference of the rack bearing 15 so as to be able to slide thereon.

Furthermore, the steering device 1 has a sensor and/or evaluation installation 16 which is only schematically indicated here. The sensor and/or evaluation installation 16 can be configured as an integral component part of the drive 10. The sensor and/or evaluation installation 16 in this exemplary arrangement has a steering angle sensor 17 and a current consumption sensor 18. The steering angle sensor 17 and the current consumption sensor 18 are also only schematically indicated here. Alternatively or additionally to the current consumption sensor 18, the steering device 1, or the sensor and/or evaluation installation 16, respectively, can have a torque sensor not illustrated in more detail here.

Figure 2:
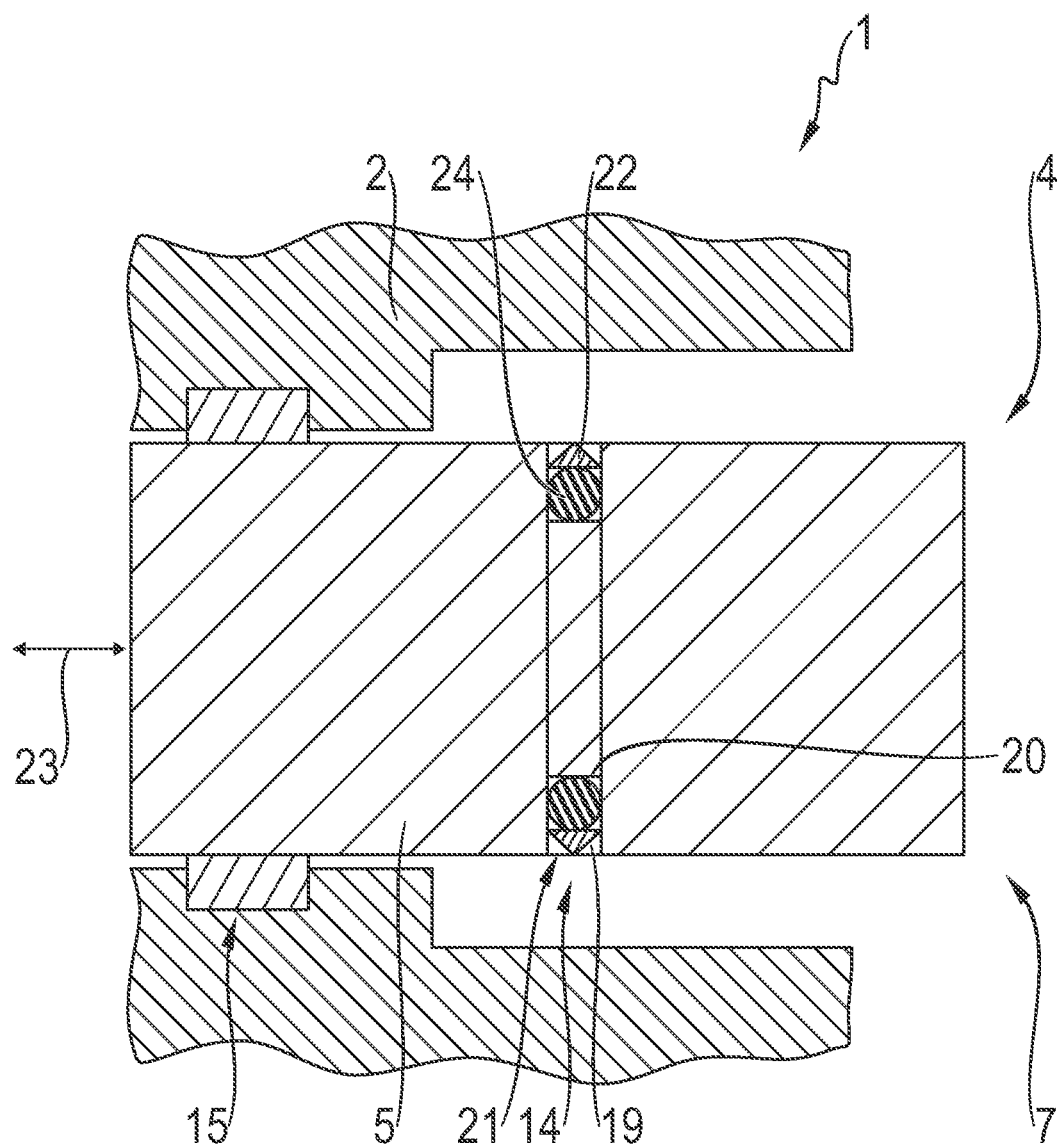
FIG. 2 shows a fragment of a sectional lateral view of the steering device according to the disclosure and according to FIG. 1, prior to an ingress of water.

FIG. 2 shows a fragment of a sectional lateral view of the steering device 1 according to the invention and according to FIG. 1, prior to an ingress of water. The rack 5 has a groove 19 which is configured in an external circumference of the rack 5. The groove 19 is configured so as to radially encircle the longitudinal axis of the rack 5. The groove 19 has a groove base 20 which lies so as to be radial to the longitudinal axis of the rack 5 and inside in relation to the external diameter of the rack 5. The groove 19 opposite the groove base 20 forms a groove opening 21. The groove opening 21 here is simultaneously configured in the external circumference of the rack 5.

In this exemplary arrangement, the friction installation 14 has a reaction element 22. The reaction element 22 is formed from a water-absorbent material, in this exemplary arrangement specifically from a water-absorbent plastics material. The reaction element 22 is disposed within the groove 19. The reaction element 22 here is configured as a ring. In this exemplary arrangement, the reaction element 22, in a merely exemplary manner, has a triangular cross section. Alternatively however, other cross-sectional configurations of the reaction element 22, for example a square, rectangular, round or oval cross-section, or any other suitable cross section, are also conceivable.

In the absence of contact between the reaction element 22 and water, the reaction element 22 is disposed within the external diameter of the rack 5. In this way, in the absence of contact with water, the reaction element 22 does not protrude from the groove 19 and radially outward beyond the external circumference, or external diameter, respectively, of the rack 5. In this exemplary arrangement, the maximum external diameter of the reaction element 22 terminates at the external circumference, or external diameter, respectively, of the rack 5. In this way, the reaction element 22 and thus the friction installation 14 in the absence of contact with water does not have any influence whatsoever on the functional mode of the steering device 1. During the operation of the steering device 1, when the rack 5 is correspondingly moved in the longitudinal direction of the rack 5, according to arrow 23, the friction installation 14, or the reaction element 22, can thus pass the rack bearing 15 without any variance in terms of the friction, or without any substantial variance in terms of the friction, respectively.

In this exemplary arrangement the friction installation 14 has a spring element 24. The spring element 24 interacts with the reaction element 22. To this end, the spring element 24 is likewise disposed in the groove 19. The spring element 24 is disposed between the groove base 20 and the reaction element 22. In this exemplary arrangement the spring element 24 is configured as an O-ring. The functional mode of the spring element 24 will still be described in more detail by FIG. 3 hereunder.

Figure 3:
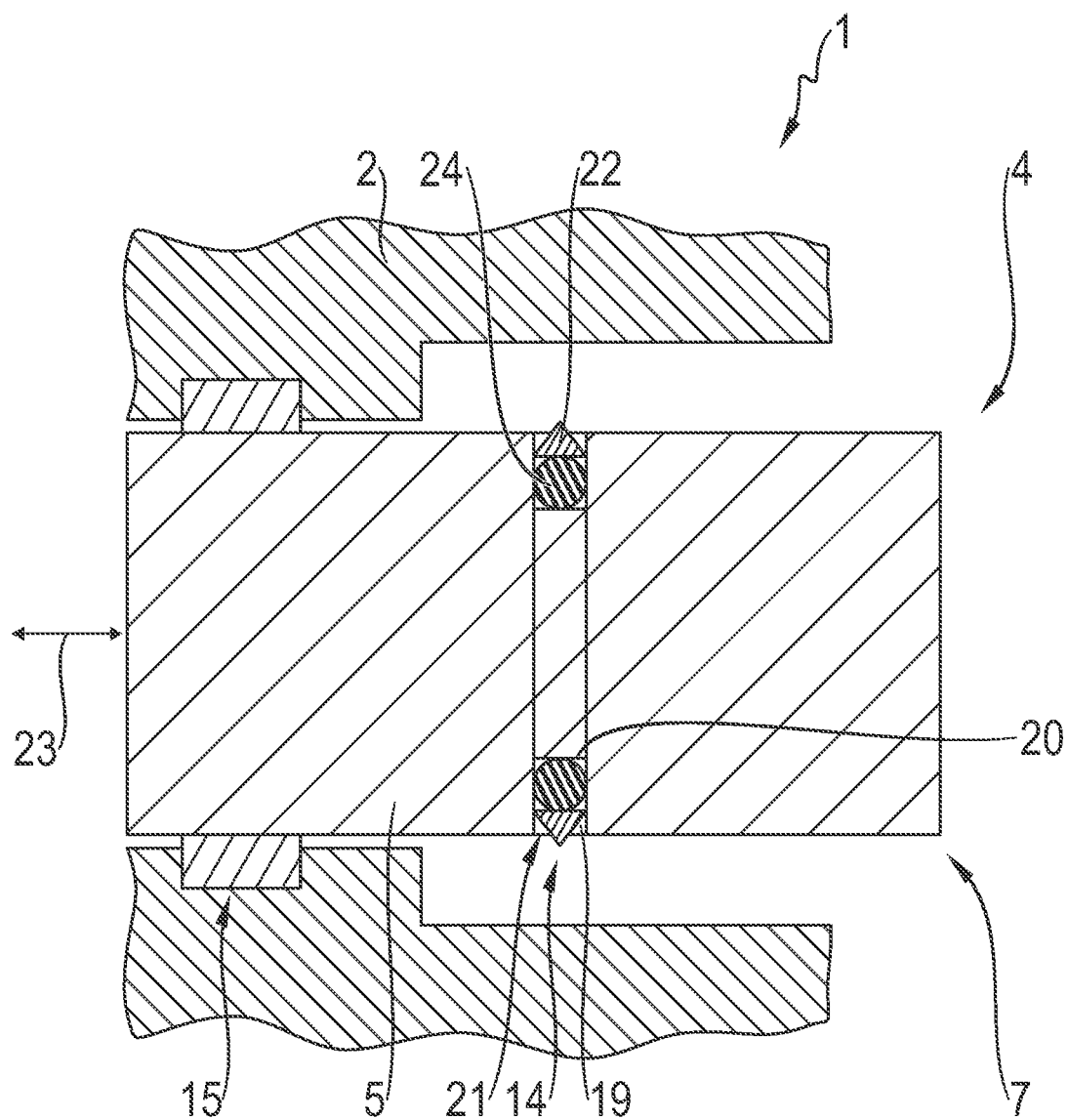
FIG. 3 shows a fragment of a sectional lateral view of the steering device according to the disclosure and according to FIG. 1 upon an ingress of water.

FIG. 3 shows a fragment of the sectional lateral view of the steering device 1 according to the disclosure and according to FIG. 1, upon an ingress of water. Upon an ingress of water into the housing 2, for example upon damage to one of the two sealing elements 8, 9, the ingressing water comes in contact with the reaction element 22. The reaction element 22 expands by virtue of absorbing water, or the volume of the reaction element 22 increases by virtue of absorbing water, respectively. As a result, the reaction element 22 extends outward from the groove 19, radially to the longitudinal axis of the rack 5, and beyond the external circumference, or external diameter, respectively, of the rack 5. In this way, the friction installation 14, or the reaction element 22, respectively, upon coming into contact with water, or upon the ingress of water, respectively, has an external diameter which is larger than the external diameter of the rack 5. As a result, the friction installation 14 causes the increase in friction when passing the rack bearing 15.

In order to however simultaneously maintain the functionality of the steering device 1, the reaction element 22 when passing the rack bearing 15 is pressed against the spring element 24. The spring element 24 is compressed as a result, and the reaction element 22 is pressed completely into the groove 19 when passing the rack bearing 15. By virtue of the spring action of the spring element 24 that is directed outward, radially to the longitudinal axis of the rack 5, the friction when the friction installation 14 passes through the rack bearing 15 is increased in comparison to passing portions of the rack 5 without the friction installation 14.

The increase in friction by virtue of the friction installation 14 and upon reacting to an ingress of water, or upon contact with water, respectively, is detected or determined, respectively, by the steering angle sensor 17 and the current consumption sensor 18 according to FIG. 1. The current consumption sensor 18 herein detects a current consumption peak for the drive 10 according to FIG. 1. By virtue of the predefined location or position, respectively, of the friction installation 14 on the rack 5 and of the rack bearing 15 on the housing 2, the increase in friction to be expected in the event of an ingress of water and upon contact between water and the reaction element 22, or the current consumption peak, respectively, is assigned to a predefined steering angle or steering angle range. When an increase in friction by virtue of a current consumption peak detected by the current consumption sensor 18 is thus detected at a predefined steering angle or steering angle region that is determinable by the steering angle sensor 17, this is thus considered to be an indication of an undesirable ingress of water into the housing 2.

The driver of the vehicle, for example, can thereupon be alerted to the ingress of water, to any damage or to servicing to be carried out. An ingress of water is thus identified at an early stage by the solution according to the disclosure, and comparatively great damage, including a total failure of the steering device 1, can be avoided.

The invention claimed is:

1. A steering device for steering a vehicle, comprising, a housing wherein the rack is movable in a longitudinal direction of the rack and in relation to the housing, and wherein the steering device further includes a detection installation for detecting an ingress of water, wherein the detection installation has at least one friction installation which reacts to an ingress of water, the friction installation being disposed in a groove of the rack, at a predefined position and on an external circumference of the rack, the groove being configured in the external circumference of the rack so as to encircle a longitudinal axis of the rack, the friction installation upon reacting to the ingress of water and in the event of a movement of the rack causing an increase in friction, wherein the increase in friction of the friction installation and upon reacting to the ingress of water is limited in terms of a location and/or predefined in terms of the location, the friction installation being disposed at a predefined position.

2. The steering device as claimed in claim 1, wherein the rack is mounted within the housing by at least one rack bearing, the external circumference of the rack bearing so as to be able to slide on an internal circumference of the rack bearing, and the friction installation when passing the rack bearing and upon reacting to the ingress of water causing the increase in friction.

3. A steering device for steering a vehicle, comprising,
a housing wherein a rack is movable in a longitudinal direction of the rack and in relation to the housing, and
a detection installation for detecting an ingress of water, wherein the detection installation has at least one friction installation which reacts to an ingress of water, the friction installation, upon reacting to the ingress of water and in the event of a movement of the rack causing an increase in friction,
wherein the friction installation has a reaction element, the reaction element being formed from a water-absorbent material, and the reaction element expanding by virtue of absorbing water and/or a volume of the reaction element increasing by virtue of absorbing water, wherein the reaction element is formed from a water-absorbent plastics material.

4. The steering device as claimed in claim 3, wherein the friction installation has a spring element, the spring element interacting with the reaction element, the reaction element and the spring element being disposed in a groove, the spring element being between a groove base of the groove and the reaction element.

5. The steering device as claimed in claim 4, wherein the spring element is configured as an O-ring.

6. The steering device as claimed in claim 5, wherein the increase in friction of the friction installation upon reacting to the ingress of water is detectable and/or determinable by virtue of a current consumption peak for a drive for moving the rack, the increase in friction to be expected in the event of an ingress of water and/or the current consumption peak being assigned to a predefined steering angle or steering angle range, the steering angle or steering angle range being predefined by virtue of the predefined position of the friction installation on the rack and in relation to the predefined position of a rack bearing.

7. A steering device for steering a vehicle, comprising,
a housing,
wherein a rack is movable in a longitudinal direction of the rack and in relation to the housing, and
a detection installation for detecting an ingress of water, wherein the detection installation has at least one friction installation which reacts to an ingress of water, the friction installation upon reacting to the ingress of water and in the event of a movement of the rack causing an increase in friction,
wherein the friction installation is disposed on the rack, the friction installation being disposed in a groove of the rack, the groove being configured in the external circumference of the rack so as to encircle a longitudinal axis of the rack.

8. The steering device as claimed in claim 7, wherein the rack is mounted within the housing by at least one rack bearing, wherein an external circumference of the rack bears on an internal circumference of the rack bearing so as to be able to slide on the internal circumference of the rack bearing, and the friction installation when passing the rack bearing and upon reacting to the ingress of water causing the increase in friction.

9. The steering device as claimed in claim 7, wherein the increase in friction is determinable by a sensor and/or evaluation installation.

10. The steering device as claimed in claim 9, wherein the increase in friction is detectable and/or determinable by a steering angle sensor and/or a current consumption sensor.

11. The steering device as claimed in claim 7, wherein the increase in friction of the friction installation upon reacting to the ingress of water is detectable and/or determinable by virtue of a current consumption peak for a drive for moving the rack, the increase in friction to be expected in the event of an ingress of water and/or the current consumption peak being assigned to a predefined steering angle or steering angle range, the steering angle or steering angle range being predefined by virtue of a predefined position of the friction installation on the rack and in relation to a predefined position of a rack bearing.

12. A method for detecting an ingress of water using a steering device as claimed in claim 7, the detection installation having the at least one friction installation that reacts to an ingress of water, and an increase in friction being caused by the friction installation upon reacting to the ingress of water and in the event of a movement of the rack.

13. The method as claimed in claim 12, wherein the increase in friction is detected and/or determined by a steering angle sensor and/or a current consumption sensor, the increase in friction of the friction installation upon reacting to the ingress of water being detected and/or determined by virtue of a current consumption peak for a drive for moving the rack, the increase of friction to be expected in the event of an ingress of water and/or the current consumption peak being assigned to a predefined steering angle or steering angle range, and the steering angle or steering angle range being predefined by virtue of the predefined position of the friction installation on the rack and in relation to the predefined position of a rack bearing.

14. The steering device as claimed in claim 7, wherein the friction installation has a reaction element, the reaction element being formed from a water-absorbent material, and the reaction element expanding by virtue of absorbing water and/or a volume of the reaction element increasing by virtue of absorbing water, wherein the reaction element is formed from a water-absorbent plastics material.

15. The steering device as claimed in claim 14, wherein the reaction element is configured as a ring.

16. The steering device as claimed in claim 15, wherein the increase in friction is determinable by a steering angle sensor and/or a current consumption sensor.

* * * * *